INVENTOR.
Eugene R. Ziegler
HIS ATTORNEY

INVENTOR.
Eugene R. Ziegler
BY
HIS ATTORNEY

United States Patent Office 3,055,304
Patented Sept. 25, 1962

3,055,304
PUMP AND CONTROL SYSTEM THEREFOR
Eugene R. Ziegler, Spencerport, N.Y., assignor to General Motors Corporation, Detroit, Mich., a corporation of Delaware
Filed Feb. 11, 1959, Ser. No. 792,631
7 Claims. (Cl. 103—25)

This invention pertains to electric motor driven pumps, and particularly to a windshield washer pump and control system therefor.

In my earlier application Serial No. 780,368, filed December 15, 1958, a windshield washer pump driven by an electric motor is disclosed wherein the time interval of operation, and hence the quantity of liquid solvent pumped, is controlled by a thermal electric timer. The present invention relates to an improved control system for a pump of this type wherein the thermal electric timer can be manually energized to initiate an automatic washing cycle for a predetermined time interval or the thermal electric timer can be automatically intermittently energized to effect intermittent operation of the pump. Intermittent operation of a windshield washer is oftentimes desirable since it conserves the supply of liquid solvent while assisting in the maintenance of a clear field of vision during driving conditions in which dirt is continuously splattered onto the windshield. Accordingly, among my objects are the provision of an electrically operated washer pump and control means therefor which are operable to either effect continuous operation of the pump for a predetermined time interval or intermittently operate the pump; the further provision of an electric motor driven centrifugal pump assembly including timing means selectively operable to either effect continuous operation of the pump for a predetermined interval or effect automatic intermittent pump operation; and the still further provision of a dual purpose thermal electric timer for controlling the operation of an electrically operated device.

The aforementioned and other objects are accomplished in the present invention by incorporating a thermostatic timer in the energizing circuit of an electrically operated device and a pair of energizing circuits for the timer. Specifically, the electrically operated device disclosed herein comprises an electric motor for rotating a centrifugal pump impeller. The motor driven centrifugal pump assembly is supported on the cover of a liquid solvent reservoir and comprises a small electric motor, the shaft of which is connected by means of a resilient coupling to a pump shaft. The pump shaft extends into the reservoir and is enclosed by a support tube. A pump housing is attached to the support tube and communicates with the reservoir adjacent the bottom thereof through an inlet port. The pump housing has an outlet port which is connected to a delivery conduit.

The energizing circuit for the motor includes a battery, one terminal of which is connected to ground, and the other terminal of which is connected to one of the commutator brushes. The motor is of the permanent magnet type, and the other commutator brush is connected to one end of a bimetallic element. The other end of the bimetallic element carries a pair of contacts which are engageable with a pair of spaced fixed contacts. A resistance coil is wound about the bimetallic element, and the other end being connected to a manually movable switch contact.

The two spaced fixed contacts which are selectively engageable with the bimetallic carried contacts are, in turn, connected to a pair of fixed contacts of a single pole, double throw switch. The movable contact of the single pole, double throw switch is connected to ground. The manually movable switch to which the other end of the resistance coil is connected is likewise of the single pole, double throw type. One of the stationary contacts of the latter switch is connected to the battery, and the other terminal is connected through a push button switch to ground.

The movable switch contacts of the two single pole, double throw switches are mechanically interconnected. In one position of these switch contacts, closure of the push button switch energizes the resistance coil through the armatures of the motor. As soon as the bimetal is sufficiently heated, it warps whereby a shunt circuit is completed around the push button switch thereby energizing the motor at full battery voltage. The motor will then operate for a predetermined time interval as determined by the characteristics of the bimetal strip.

When the movable switch contact of the two double throw, single pole switches are moved to the second position, the resistance coil is connected directly across the battery independently of the push button switch. At the same time, the motor is connected across the battery through the bimetal element. As soon as the bimetal element is heated sufficiently so as to warp, the energizing circuit for the motor is interrupted simultaneously with interruption of the energizing circuit for the resistance heater. As long as the movable contacts of the two single pole, double throw switches are maintained in the second position, the washer pump will be automatically intermittently operated. The time interval of washer pump operation is substantially shorter than during the full automatic washing cycle since the motor is only energized for the length of time required to warp the bimetal element during energization of the resistance coil. On the other hand, the motor is deenergized for the length of the time required to cool the bimetal element.

Further objects and advantages of the present invention will be apparent from the following description, reference being had to the accompanying drawings, wherein a preferred embodiment of the present invention is clearly shown.

Figure 1:
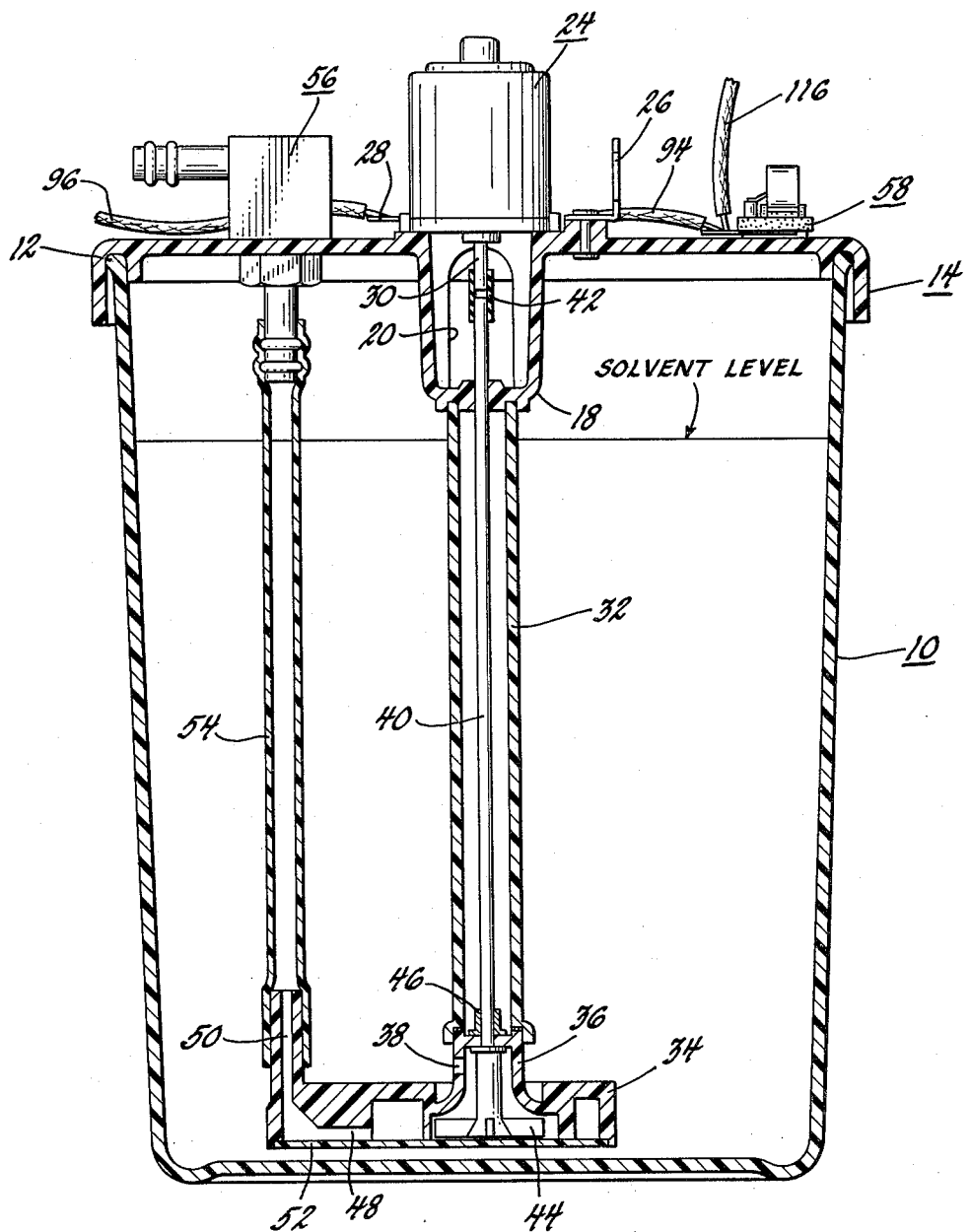
FIGURE 1 is a view, partly in section and partly in elevation, of a pump and reservoir assembly constructed according to the present invention.

With particular reference to FIGURE 1, the pump assembly comprises a box-like plastic reservoir 10 having an open top with an enlarged peripheral lip 12. The reservoir is designed to be filled with liquid solvent to the level indicated in FIGURE 1, and the open top is closed by a plastic cover assembly 14 having a peripheral groove adapted to snugly receive the lip 12 of the reservoir so as to retain the cover and the reservoir in assembled relation. The cover 14 may be provided with a conventional fill opening, not shown, which is closed by a cap in the manner depicted in copending application Serial No. 764,120 filed September 29, 1958, now abandoned, in the name of Hart et al. and assigned to the assignee of this invention.

The cover is formed with a substantially centrally located downwardly extending projection 18 having one or more elongate side openings, 20. A small permanent magnet-type direct current electric motor 24 is suitably secured to the cover 14 at the projection 18. The motor 24 has a pair of terminals 26 and 28 which are electrically connected to the brushes, not shown. The motor armature includes a drive shaft 30 that extends downwardly into the projection 18.

A plastic support tube 32 has its upper end suitably attached, such as by means of cement, to the projection 18. The lower end of the support tube 32 is cemented to a plastic pump housing 34 having an upstanding bearing boss 36. The pump housing 34 is formed with one or more inlet openings 38 connecting the interior of the pump housing with the reservoir 10.

A pump shaft 40 is connected to the motor shaft 30 by a rubber sleeve coupling 42. A centrifugal impeller 44 is press fitted onto the lower end of the pump shaft, the impeller being disposed within the pump housing 34. A retainer ring 46 is attached to the pump shaft 40, and is engageable with the upper surface of the bearing boss 36 so as to prevent downward movement of the pump shaft 40 relative to the support tube 32.

The pump housing 34 is formed with an outlet passage 48 which connects with an outlet port 50. The bottom of the pump housing is closed by a plastic cover 52, and the outlet port is connected to one end of a delivery conduit 54. The other end of the delivery conduit 54 is connected to a nipple assembly 56 supported on the cover 14.

Figure 2:
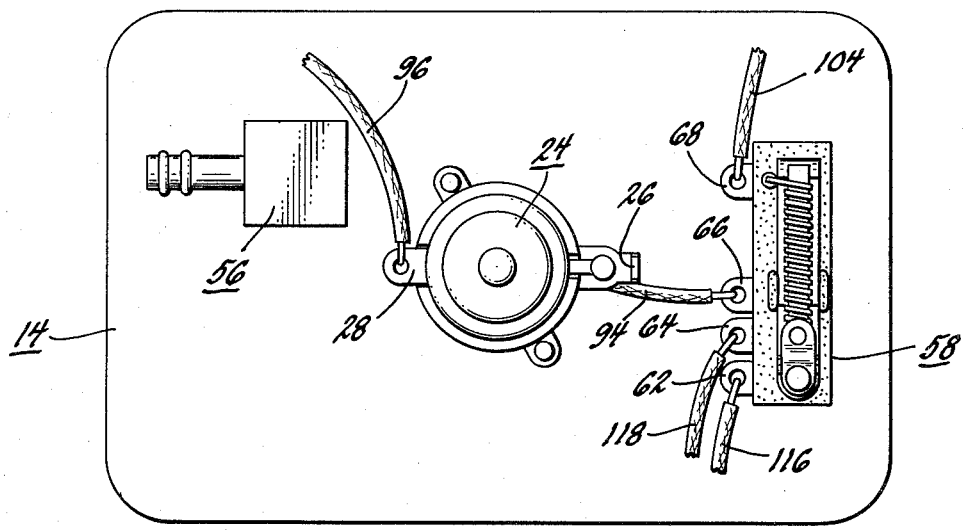
FIGURE 2 is a plan view of the cover and thermal electric timer assembly.
Figure 3:
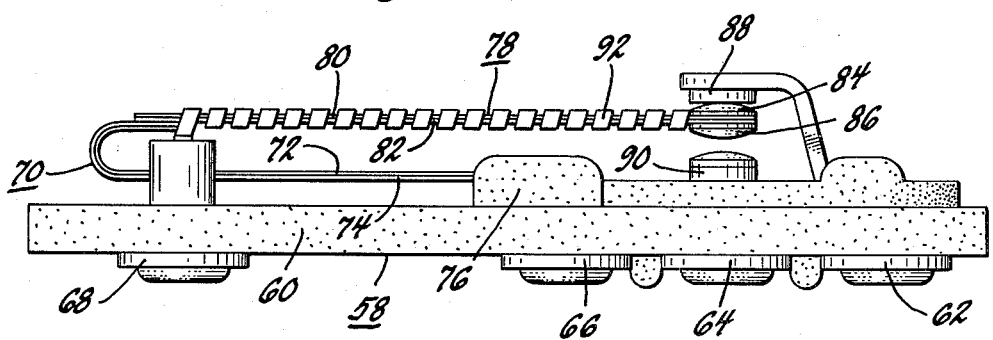
FIGURE 3 is a side view of the thermal electric timer assembly.

With particular reference to FIGURES 1 and 2, a timer assembly 58 is mounted on the cover 14. As seen particularly in FIGURE 3, the timer assembly comprises a phenolic base plate 60 having four terminals 62, 64, 66 and 68 riveted thereto. The thermal electric timer includes a U-shaped compensating bimetallic strip 70 having a high expansion side 72 and a low expansion side 74. The right hand end of the compensating bimetallic strip 70 is secured to a boss 76 of the base 60 and is electrically connected to the terminal 66. The other end of the compensating bimetallic strip 70 is welded to a flat bimetallic strip 78 having a high expansion side 80 and a low expansion side 82. The free end of the flat bimetallic strip 78 carries a pair of contacts 84 and 86. The contact 84 is engageable with a fixed contact 88 that is electrically connected to the terminal 62. The contact 86 is engageable with a fixed contact 90 which is electrically connected to the terminal 64. A nichrome ribbon resistor 92 is wound about the flat bimetallic strip 78, the outer end of the resistor ribbon 92 being welded to the bimetal strip in the area of contacts 84 and 86. The inner end of the ribbon resistor 92 is electrically connected to the terminal 68.

Figure 4:
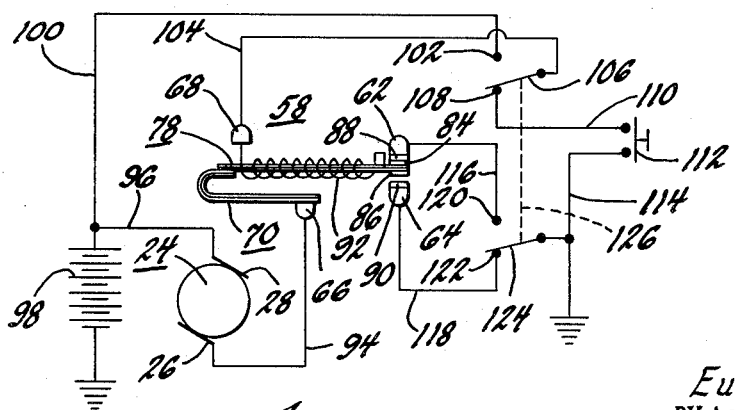
FIGURE 4 is a schematic view of the energizing circuits for the pump motor.

As seen in FIGURE 2, the motor terminal 26 is connected by wire 94 to the timer terminal 66. The motor terminal 28 is connected to a wire 96. Referring to FIGURE 4, the wire 96 is connected with one terminal of a battery 98, the other terminal of which is grounded. A second wire 100 is connected to this battery terminal and a stationary switch contact 102. The timer terminal 68 is connected by wire 104 to a movable switch contact 106. The movable switch contact 106 is engageable with either fixed contact 102 or fixed contact 108. Contact 108 is connected by wire 110 with the contact of push button switch 112. The other contact of the push button switch 112 is connected by wire 114 to ground, the timer terminals 62 and 64 are connected by wires 116 and 118, respectively to stationary contacts 120 and 122, respectively. A movable contact 124, which is connected to the ground wire 114, is engageable with either of the stationary contacts 120 or 122. In addition, the movable contacts 106 and 124 of the single pole, double throw switches are mechanically interconnected as indicated by numeral 126.

Normally, the movable switch contacts 106 and 124 engage fixed contacts 108 and 122, respectively and the push button switch 112 is open. Under these conditions, the motor 24 is deenergized. To initiate an automatic washing cycle wherein the pump is continuously operated for a predetermined time interval so as to deliver a predetermined amount of liquid solvent from the reservoir 10, the push button switch 112 is momentarily closed. Upon closure of the push button switch 112 the resistance heater 92 is energized from the battery 98 through the wire 96, the terminal 28, the motor armature, the terminal 26, the wire 94, the terminal 66, the bimetallic strip 70, the bimetallic strip 78, the resistance heater 92, the terminal 68, the wire 104, switch contacts 106 and 108, the wire 110, the push button switch 112 and the wire 114. At this time the motor will be energized at reduced voltage since the resistance heater 92 is connected in series with the armature. Upon energization of the resistance heater 92, the bimetal strip 78 will become heated and the bimetal will warp so that contact 86 will engage contact 90.

When contact 86 engages contact 90, the push button switch 112 can be opened, since at this time the resistance heater 92 is shorted out by the shunt circuit including ground wire 114, switch contacts 124 and 122, wire 118, terminal 64, and contacts 90 and 86. The motor 24 will be energized at full battery voltage until the bimetal element 78 cools sufficiently to separate contacts 86 and 90. Thus, the washer pump will be automatically operated for a predetermined time interval and thereafter automatically arrested.

In order to operate the washer pump for intermittent cycles of short duration, the switch contacts 106 and 124 are moved into engagement with contacts 102 and 120, respectively. The intermittent energization of the washer pump will be automatically controlled by the thermal electric timer independently of further manual control, since when contact 106 engages contact 102 and contact 124 engages contact 120 with the bimetal element 78 in the normal position, the resistance heater 92 will be connected directly across the battery 98 through wire 100, contacts 102 and 106, wire 104, terminal 68, the resistance ribbon 92, the bimetal element 78, the contacts 84 and 88, the terminal 62, and the wire 116, the contacts 120 and 124 and ground wire 114. The motor will likewise be connected directly across the battery through wire 96, terminal 28, the motor armature, terminal 26, the wire 94, terminal 66, bimetallic strips 70 and 78, contacts 84 and 88, terminal 62, wire 116, contacts 120 and 124 and the ground wire 114. As soon as the bimetal strip 78 is heated sufficiently to warp downwardly so that contacts 84 and 88 are disengaged, the motor will be deenergized, as will the resistance heater 92.

Accordingly, during automatic intermittent washer pump operation in the motor 24 is energized simultaneously with energization of the resistance heater 92 for the interval required to heat the bimetal element 78 sufficiently to separate contacts 84 and 88. The washer pump motor will be deenergized for the length of time required to cool the bimetal element 78 until contacts 84 and 88 are reengaged. Consequently, during automatic intermittent washer operation the interval of washer operation is short as compared to the interval of rest since it requires appreciably more time for the bimetal strip 78 to cool than it does to be heated by the resistance heater 92.

While the embodiment of the invention as herein disclosed constitutes a preferred form, it is to be understood that other forms might be adopted.

What is claimed is as follows:

1. A windshield washer including, a pump, means for actuating said pump, first and second manually operable means for initiating operation of said actuating means, and common control means operable to effect continuous operation of the actuating means for a predetermined time interval and then automatically arrest said actuating means when one of said manually operable means is actuated, and operable to effect automatic intermittent operation of said actuating means when the other of said manually operable means is actuated.

2. A windshield washer including a pump, an electric motor for actuating said pump, first and second manually operable means for initiating energization of said electric motor, and common control means operable to effect continuous energization of said motor for a predetermined time interval and then automatically deenergize said motor when one of said manually operable means is actuated, and operable to effect automatic intermittent energization of said motor when the other of said manually operable means is actuated.

3. A windshield washer including, a pump, electrical means for actuating said pump, first and second manually operable controls for energizing said electrical means, and thermally responsive means controlling the energization of said electrical means whereby when one of said controls is actuated, said thermally responsive means will effect continuous energization of said electrical means for a predetermined time interval and then automatically arrest said electrical means, and when the other of the manually operable controls is actuated said thermally responsive means will effect automatic intermittent energization of said electrical means.

4. A windshield washer including, a pump, an electric motor for actuating said pump, a first energizing circuit for said motor including a first manually operable switch and a thermally responsive switch connected in parallel therewith, said thermally responsive switch being operable to maintain energization of said motor for a predetermined time interval and then automatically deenergize said motor, and a second energizing circuit for said motor including second manually operable switch means and said thermally responsive switch to effect automatic intermittent energization of said motor.

5. A windshield washer including, a pump, an electric motor for actuating said pump, manually operable switch means for energizing said motor, and thermally responsive switch means to effect automatic intermittent energization of said motor as long as said manually operable switch means is closed.

6. A windshield washer including, a pump, an electric motor for actuating said pump, a thermal electric timer for controlling the interval of activation of said motor, first switch means to energize said thermal electric timer whereby said timer will effect continuous operation of said motor for a predetermined time interval and then automatically arrest said motor, and second switch means to effect automatic intermittent energization of said thermal electric timer whereby said thermal electric timer will effect automatic intermittent energization of said motor.

7. A windshield washer including, a pump, an electric motor for actuating said pump, an energizing circuit for said motor including a battery and a bimetallic switch movable between two circuit closing positions, a heater for said bimetallic switch which, when energized, heats said bimetallic switch and moves it to one of its circuit closing positions, said bimetallic switch when cool assuming its other circuit closing position, a first circuit including first manually operable switch means for energizing said heater to effect movement of said bimetallic switch to said one circuit closing position wherein the motor is continuously energized for a predetermined time interval and is automatically deenergized upon cooling of said bimetal switch, and a second circuit including second manually operable switch means for energizing said heater and completing an energizing circuit for said motor and said heater when said bimetallic switch is in said other circuit closing position whereby the motor will be automatically intermittently energized.

References Cited in the file of this patent

UNITED STATES PATENTS

| | | |
|---|---|---|
| 1,355,847 | Rathman | Oct. 19, 1920 |
| 1,784,205 | Seeger | Dec. 9, 1930 |
| 2,240,607 | Buck | May 6, 1941 |
| 2,502,180 | Smulski | Mar. 28, 1950 |
| 2,749,495 | Walley | June 5, 1956 |
| 2,774,929 | Schaefer | Dec. 18, 1956 |
| 2,784,876 | Parkes | Mar. 12, 1957 |
| 2,872,075 | Steiner | Feb. 3, 1959 |

FOREIGN PATENTS

| | | |
|---|---|---|
| 946,414 | Germany | Aug. 2, 1956 |
| 1,020,538 | Germany | Dec. 5, 1957 |